US005223720A

United States Patent [19]

Weyer

[11] Patent Number: 5,223,720

[45] Date of Patent: Jun. 29, 1993

[54] PREDICTING REGISTER MARK POSITION WITH DATA SHIFTING AND COINCIDENCE DETECTION

[75] Inventor: John H. Weyer, Hertfordshire, England

[73] Assignee: Harland Crosfield Ltd., England

[21] Appl. No.: 801,655

[22] Filed: Dec. 2, 1991

[30] Foreign Application Priority Data

Nov. 30, 1990 [GB] United Kingdom .............. 9026087.8

[51] Int. Cl.[5] .............................................. G01N 21/86

[52] U.S. Cl. ..................................... 250/548; 250/557

[58] Field of Search .................. 250/548, 557; 226/45; 358/101, 107

[56] References Cited

U.S. PATENT DOCUMENTS

| | | | |
|---|---|---|---|
| 4,142,105 | 2/1979 | Erdmann | 250/548 |
| 4,390,955 | 6/1983 | Arimura | 358/101 |
| 4,435,835 | 3/1984 | Sakow et al. | 358/101 |
| 4,600,841 | 7/1986 | Tokuno et al. | 250/548 |
| 4,640,613 | 2/1987 | Yokoyama et al. | |
| 4,665,318 | 5/1987 | Toda et al. | 250/557 |
| 4,698,514 | 10/1987 | Hilmersson et al. | 250/548 |
| 4,719,575 | 1/1988 | Gnuechtel | 250/548 |
| 4,864,631 | 9/1989 | Jensen | 250/548 |
| 4,972,088 | 11/1990 | Weyer et al. | 250/548 |

FOREIGN PATENT DOCUMENTS

| | | |
|---|---|---|
| 0390389 | 10/1990 | European Pat. Off. |
| 3433947 | 1/1985 | Fed. Rep. of Germany |
| 59-101366 | 11/1984 | Japan |

OTHER PUBLICATIONS

Patent Abstracts of Japan, vol. 004-040, Mar. 28, 1980, Publication No. 55011343, Arimura Yoshiaki, application No. 53083844.

Japanese Patent No. 59-101366 (Abstract, Atsushi Katada, Jun. 11, 1984.

*Primary Examiner*—David C. Nelms
*Attorney, Agent, or Firm*—Sughrue, Mion, Zinn, Macpeak & Seas

[57] ABSTRACT

A method and apparatus for predicting the position of a register mark within an image on an elongate web relative to a reference position of the mark when the image is at a reference position is described. The apparatus includes a detector for obtaining successive samples of the image; a comparator for comparing the samples with a reference threshold so as to generate a binary sequence; and a comparator for comparing the binary sequence with a reference sequence. The apparatus is operable to carry out a series of comparisons between the two sequences with the sequences offset by successive one bit intervals and at each offset position, the number of coincidences between binary values is summed by counters. The resultant sums are then compared and the highest is taken to indicate the degree of offset between the two sequences and is used to predict that the register mark has the same offset.

8 Claims, 1 Drawing Sheet

PREDICTING REGISTER MARK POSITION WITH DATA SHIFTING AND COINCIDENCE DETECTION

FIELD OF THE INVENTION

This invention relates to a method of predicting the position of a register mark within an image on an elongate web.

DESCRIPTION OF THE PRIOR ART

A method of detecting a register mark on a web carrying a series of identical images, the register mark being part of the image, is described in EP-A-0390389.

A sharp edge is found within the image and this edge is defined as the register mark. In order to obtain reliable performance the distance either side of an edge which is to be used for a registration mark should be a predefined distance, typically ±5 mm clear of any similar edge. At press start-up it is sometimes possible for the print to move out of register by as much as 25 mm with respect to the reference position. Under these conditions a long range search is required in order to refind the edge being used as a register mark. A method of achieving this long range search is by auto-correlation. This uses a mathematically intensive process which is either very time consuming or requires expensive multiplier accumulator hardware.

SUMMARY OF THE INVENTION

In accordance with one aspect of the present invention, a method of predicting the position of a register mark within an image on an elongate web relative to a reference position of the mark when the image is at a reference position comprises obtaining successive samples of the image and generating a corresponding binary sequence by comparing the samples with a threshold; comparing the binary sequence with a reference sequence in which the register mark is at the reference position by successively offsetting the two sequences and comparing the number of coincidences between binary values in the two sequences at each relative position; and determining the amount by which the image is offset from its reference position by reference to the offset position of the binary sequence which has the highest number of coincidences with the reference sequence, the register mark being predicted to be offset from its reference position by a similar amount.

The present invention uses simple logic and is both cheap and fast.

Preferably the samples are obtained by irradiating a portion of the image and viewing this portion with one or more radiation sensitive detectors. The samples of the image may be taken in single pixel steps or preferably multiple detectors will detect multiple pixel samples together. Preferably the sampling threshold is chosen to lie halfway between the maximum and minimum values of the samples. Typically, the image is sampled every one millimeter.

In the preferred example, both the reference binary sequence and the sequence which is compared with that reference is obtained by sampling at least along the full length of the image. In the case where the image is mounted on a cylinder, the sequences may be obtained by sampling through a full rotation of the cylinder or even a little more than a full rotation. However, it is also conceivable that at least the reference binary sequence could be obtained by sampling the image along a track which is shorter than the length of the image.

In accordance with a second aspect of the present invention, apparatus for predicting the position of a register mark within an image on an elongate web relative to a reference position of the mark when the image is at a reference position comprises sampling means for obtaining successive samples of the image; comparison means to compare the samples with a threshold so as to form a binary sequence; and processing means for comparing the binary sequence with a reference sequence in which the register mark is at the reference position by successively offsetting the two sequences and comparing the number of coincidences between binary values in the two sequences at each relative position, and for determining the amount by which the image is offset from its reference position by reference to the offset position of the binary sequence which has the highest number of coincidences with the reference sequence, the register mark being predicted to be offset from its reference position by a similar amount.

The method and apparatus of the invention enable the relative offset of the image from its reference position to be determined and it is then assumed that the register mark will be offset by a similar amount. This offset is then supplied to register control apparatus which then, during use, monitors the web carrying the image within a window centered on the offset position within which the register mark is expected. Thus, even if the register mark is offset beyond the normal dimensions of the window, the problems encountered previously as set out above, are overcome.

Preferably the sampling means comprise one or more radiation sensitive detectors.

BRIEF DESCRIPTION OF THE DRAWINGS

An example of register mark position identification will now be described with reference to the accompanying drawings in which.

DETAILED DESCRIPTION OF AN EMBODIMENT

Figure 1:
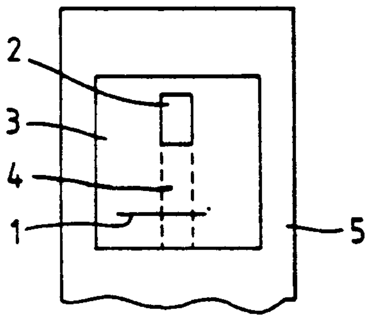
FIG. 1 shows a schematic diagram of an image on a web.
Figure 2:
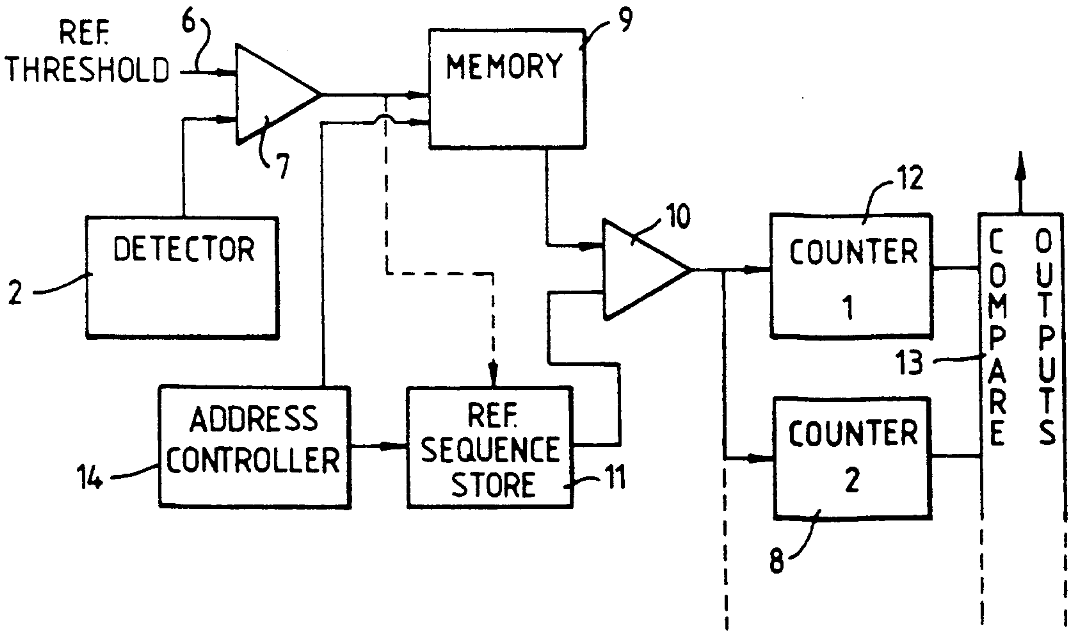
FIG. 2 shows a block diagram of apparatus for identifying a register mark position on a web as shown in FIG. 1.

A web 5 on which is printed an image 3 passes under a photodetector 2 while mounted on a rotating cylinder (not shown). The image 3 includes an edge 1 which has been chosen as a register mark. The image 3 is irradiated as it passes beneath the photodetector 2, and the photodetector 2 samples the image along a track 4. The photodetector 2 transmits an intensity signal for each sample to a comparator 7 (FIG. 2) where it is compared with a reference threshold value. One method of obtaining the reference threshold for a single cell system is to store the data temporarily in memory where it is scanned to find the maximum and minimum values. For example if the signals are converted to 8 bit digital data with 1 byte per sample and a sampling rate of 1 sample per mm, a threshold value is calculated from the mean of the maximum and minimum values and is then used to convert the 8 bit data to a single bit per sample stream.

During a start-up procedure a reference bit stream is stored in a memory 11, this bit stream defining a track including the track 4 extending around a full revolution of the cylinder. The original 8 bit data is discarded.

During normal use signals from the photodetector 2 and reference threshold 6 are compared by the comparator 7. When the sample value exceeds the threshold the comparator outputs a "1" to a memory 9, otherwise it outputs a "0" to produce a binary sequence in the memory 9 corresponding to a track running around a full revolution of the cylinder. The reference sequence in the memory 11 is then compared bit by bit with the binary sequence in the memory 9, in a comparator 10, starting with the first stored bit of each binary sequence under the control of an address controller 14. Typically, the reference sequence will be the same length as the binary sequence that has been generated (corresponding to a full revolution of the cylinder), although it need not be. For every coincidence the comparator 10 increments a counter 12 until the binary sequence in the memory 9 has been compared with all of the reference sequence in the memory 11. The address in the memory 9 at which the address controller 14 begins to output data is then incremented by one and the comparison with the reference sequence in the memory 11 is begun again effectively with the two sequences offset by one bit from their previous relative position. When the end of one bit stream is reached it is wrapped around to enable further comparisons to be made. The resulting coincidences are summed by a second counter 8. This process continues until comparisons have been made between 60 different offset versions of the binary sequence in the memory 9 and the reference sequence in the memory 11 the coincidences being recorded in 60 respective counters. A comparison of the values in the counters is then made by a comparator 13 and the highest value is taken to indicate the address in the memory 9 at which a sequence closest to the reference sequence begins in the binary sequence under test. The phase shift with the highest count value then provides an indication of the shift in the image 3 relative to its reference position from which it is assumed the register mark 1 will have shifted by a similar amount. A control signal defining the phase shift is then fed to register control apparatus (not shown) which can determine where it should look for the register mark 1.

Once the rough position of the edge 1 on the web has been determined, register control apparatus such as that described in EP-A-0390389 is used to control a printing operation, the apparatus being arranged to view the web with a window centered on the expected position of the edge.

I claim:

1. A method of predicting the position of a register mark within an image on an elongate web relative to a reference position of the mark when the image is at a reference position the method comprising obtaining successive samples of the image and generating a corresponding binary sequence by comparing said samples with a threshold; comparing said binary sequence with a reference sequence in which said register mark is at said reference position by offsetting said two sequences by successive amounts and comparing the number of coincidences between binary values in said two sequences at each relative position; and determining the amount by which said image is offset from its said reference position by reference to the offset position of said binary sequence which has the highest number of coincidences with said reference sequence, said register mark being predicted to be offset from its reference position by a similar amount.

2. A method according to claim 1, wherein said samples are obtained by irradiating a portion of said image and viewing this said portion with at least one radiation sensitive detector.

3. A method according to claim 1, wherein said samples of said image are single pixel samples.

4. A method according to claim 1, wherein each binary sequence corresponds to a track extending through at least the length of the image.

5. A method according to claim 1, wherein said threshold lies halfway between the maximum and minimum values of said image samples.

6. A method according to claim 1, wherein said image is sampled every one millimeter.

7. Apparatus for predicting the position of a register mark within an image on an elongate web relative to a reference position of the mark when the image is at a reference position comprises sampling means for obtaining successive samples of the image; comparison means to compare said samples with a threshold so as to form a binary sequence; and processing means for comparing said binary sequence with a reference sequence in which said register mark is at the reference position by offsetting said two sequences by successive amounts and comparing the number of coincidences between binary values in the two sequences at each relative position, and for determining the amount by which said image is offset from its reference position by reference to the offset position of the binary sequence which has the highest number of coincidences with the reference sequence, the register mark being predicted to be offset from its reference position by a similar amount.

8. Apparatus according to claim 7, wherein said sampling means comprise at least one radiation sensitive detector for viewing a portion of said web which has been irradiated.

* * * * *